US011228955B2

(12) United States Patent
Lin et al.

(10) Patent No.: US 11,228,955 B2
(45) Date of Patent: Jan. 18, 2022

(54) SELECTION OF WIRELESS ACCESS POINTS BASED ON SIGNAL STRENGTH AND NETWORK CONGESTION (71) Applicant: HEWLETT-PACKARD DEVELOPMENT COMPANY, L.P., Houston, TX (US)

(72) Inventors: I-Chen Lin, Taipei (TW); Robin Lin, Taipei (TW); Han-Kuang Chang, Taipei (TW); Danny Farnyih Meng, Houston, TX (US); Isaac Lagnado, Houston, TX (US); Chao-An Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 648 days.

(21) Appl. No.: 16/076,103

(22) PCT Filed: Feb. 6, 2017

(86) PCT No.: PCT/US2017/016662
§ 371 (c)(1),
(2) Date: Aug. 7, 2018

(87) PCT Pub. No.: WO2018/144028
PCT Pub. Date: Aug. 9, 2018

(65) Prior Publication Data
US 2021/0219198 A1 Jul. 15, 2021

(51) Int. Cl.
*H04W 4/00* (2018.01)
*H04W 36/08* (2009.01)
(Continued)

(52) U.S. Cl.
CPC ........... *H04W 36/08* (2013.01); *H04W 36/22* (2013.01); *H04W 36/30* (2013.01); *H04W 36/36* (2013.01); *H04W 48/20* (2013.01)

(58) Field of Classification Search
CPC ........... H04L 12/5691; H04L 29/08153; H04L 29/08243; H04L 47/125; H04W 28/08;
(Continued)

(56) References Cited

U.S. PATENT DOCUMENTS 7,466,981 B1  12/2008  Abdelhamid et al.
7,554,962 B2*  6/2009  Takeuchi .............. H04W 48/20
370/229

(Continued)

FOREIGN PATENT DOCUMENTS

CN    101449617 A    6/2009
CN    102547910 A    7/2012
(Continued)

OTHER PUBLICATIONS

Simsek et al., Analysis of the QBSS Load Element of IEEE 802.11 e for a priori Estimation of Service Quality, downloadable at http://page.mi.fu-berlin.de/katinkaw/publications/UKPEW2005.pdf, 11 pages, 2005.*

(Continued)

Primary Examiner — Frank Duong
(74) Attorney, Agent, or Firm — Tong, Rea, Bentley & Kim LLC (57) ABSTRACT In an example, a wireless client station detects a first signal emitted by a first wireless access point and a second signal emitted by a second wireless access point. The wireless client station extracts a first set of data indicative of the signal strength and network congestion of the first wireless access point and a second set of data indicative of the signal strength and network congestion of the second wireless access point. The wireless client station then computes a first performance metric of first wireless access point, based on the first set of data, and a second performance metric of the second wireless access point, based on the second set of (Continued)

data. The wireless client station determines that the first performance metric is greater than the second performance metric and initiates a connection to the first wireless access point in response.

20 Claims, 3 Drawing Sheets (51) Int. Cl.
*H04W 36/22* (2009.01)
*H04W 36/30* (2009.01)
*H04W 36/36* (2009.01)
*H04W 48/20* (2009.01)

(58) Field of Classification Search
CPC ......... H04W 28/0804; H04W 28/0808; H04W 28/0823; H04W 36/06; H04W 36/08; H04W 36/22; H04W 36/30; H04W 36/36; H04W 48/00; H04W 48/06; H04W 48/08; H04W 48/18; H04W 48/20
See application file for complete search history.

(56) References Cited

U.S. PATENT DOCUMENTS

| | | | | |
|---|---|---|---|---|
| 7,672,282 | B1* | 3/2010 | Chhabra | H04W 52/18 370/338 |
| 7,907,582 | B2* | 3/2011 | Du | H04W 48/20 370/338 |
| 8,116,285 | B1 | 2/2012 | Barnum | |
| 8,200,820 | B2* | 6/2012 | Prytz | H04W 48/18 709/225 |
| 8,570,997 | B1* | 10/2013 | Chhabra | H04W 52/18 370/338 |
| 8,908,559 | B1 | 12/2014 | Chhabra | |
| 8,942,717 | B2 | 1/2015 | Yao et al. | |
| 9,749,932 | B2* | 8/2017 | Salkintzis | H04W 48/08 |
| 9,894,580 | B1* | 2/2018 | Chen | H04W 36/08 |
| 9,900,832 | B2* | 2/2018 | Kim | H04W 48/18 |
| 10,028,215 | B2* | 7/2018 | Kim | H04W 48/20 |
| 10,271,250 | B2* | 4/2019 | Sen | H04W 36/0094 |
| 2002/0110105 | A1 | 8/2002 | Awater | |
| 2003/0139197 | A1* | 7/2003 | Kostic | H04L 47/14 455/525 |
| 2004/0039817 | A1* | 2/2004 | Lee | H04W 24/00 709/225 |
| 2008/0102852 | A1* | 5/2008 | Du | H04W 48/20 455/453 |
| 2009/0135794 | A1* | 5/2009 | Su | H04W 36/26 370/338 |
| 2013/0028116 | A1 | 1/2013 | Kostic et al. | |
| 2013/0100821 | A1 | 4/2013 | Joshi | |
| 2015/0098392 | A1 | 4/2015 | Homchaudhuri et al. | |
| 2015/0172895 | A1 | 6/2015 | Gangadhar et al. | |
| 2015/0280888 | A1 | 10/2015 | Karsi et al. | |
| 2015/0350875 | A1 | 12/2015 | Chhabra et al. | |
| 2016/0095046 | A1* | 3/2016 | Tervonen | H04W 48/08 370/338 |
| 2016/0277974 | A1* | 9/2016 | Persson | H04W 48/16 |
| 2017/0163513 | A1* | 6/2017 | Kim | H04B 17/318 |

FOREIGN PATENT DOCUMENTS

| | | |
|---|---|---|
| CN | 105547910 A | 7/2012 |
| CN | 105612790 A | 5/2016 |
| CN | 105578529 A | 11/2016 |
| WO | WO 2014/184347 | * 11/2014 |

OTHER PUBLICATIONS

Morioka et al, AP Selection Algorithm for VoIP Services in Mixed Traffic WLAN Environment, IEEE, 5 pages, 2008.*
Kurner et al., "Final Report on Self-organisation and its Implications in Wireless Access Networks", INFSO-ICT-216284 Socrates D5.9, Retrieved from Internet: http://www.fp7-socrates.eu/files/Deliverables/SOCRATES_D5.9%20Final%20report%20on%20self-organisation%20and%20its%20implications%20in%20wireless%20access%20networks.pdf, Dec. 31, 2010, 135 pages.
"Overview of the VOIP Wireless Network", CISCO, Retrieved from Internet: http://www.cisco.com/en/US/docs/voice_ip_comm/cuipph/7925g/7_0/english/administration/guide/7925wrnt.html, 2018, 14 pages.
IEEE P802.11ah, Draft Standard for Information Technology—Telecommunications and information exchange between systems Local and metropolitan area networks—Specific requirements, Sep. 2016, LAN/MAN Standards Committee of the IEE Computer Society, 660 pgs., XP068136016.

* cited by examiner

SELECTION OF WIRELESS ACCESS POINTS BASED ON SIGNAL STRENGTH AND NETWORK CONGESTION

BACKGROUND

Wireless access points (APs) are hardware devices that provide the ability for wireless client stations to connect to wired communications networks. For instance, an AP may connect directly to a wired Ethernet connection and then provide a plurality of wireless connections for wireless client stations to utilize the wired connection (e.g., using radio frequency or other near-field communication links). In this way, an AP may provide access to the wired connection for a plurality of wireless client stations.

Many APs are built to support a standard for sending and receiving data using the frequencies of these wireless connections. As an example, an AP may be built to support the Institute of Electrical and Electronics Engineers (IEEE) 802.11 standards,

DETAILED DESCRIPTION

The present disclosure broadly describes an apparatus, method, and non-transitory computer-readable medium for selecting a wireless access point (AP) based on signal strength and network congestion. A wireless client station seeking to connect to a wired communications network may have a choice of several APs via which it can connect. In many cases, the wireless client station will simply connect via the AP from which it is receiving the strongest signal or from which it first receives a signal. This approach disregards other factors, such as network congestion, which can affect the performance of the connection. For instance, as discussed above, an AP may provide access to the wired network for a plurality of wireless client stations. As such, it is possibly for the AP to become overloaded if too many wireless client stations seek to use its wireless connections at the same time to connect to the wired network.

Examples of the present disclosure consider performance metrics that allows a wireless client station to evaluate which of a plurality of candidate APs will provide the best wireless connection to a wired communications network. In one example, the candidate APs broadcast beacons, or signals which the wireless client station can detect and from which the wireless client station can extract various metrics. These metrics may include, for instance, a received signal strength indicator (RSSI), a Quality of Service enhanced basic service set (QBSS) information element, and/or a coding or data date. By considering at least signal strength and network congestion, the wireless client station may be able to better determine which of the candidate APs is best equipped to provide the best connection to the wired communications network. Thus, in effect, the wireless client station may perform client-side load balancing of the candidate APs.

Figure 1:
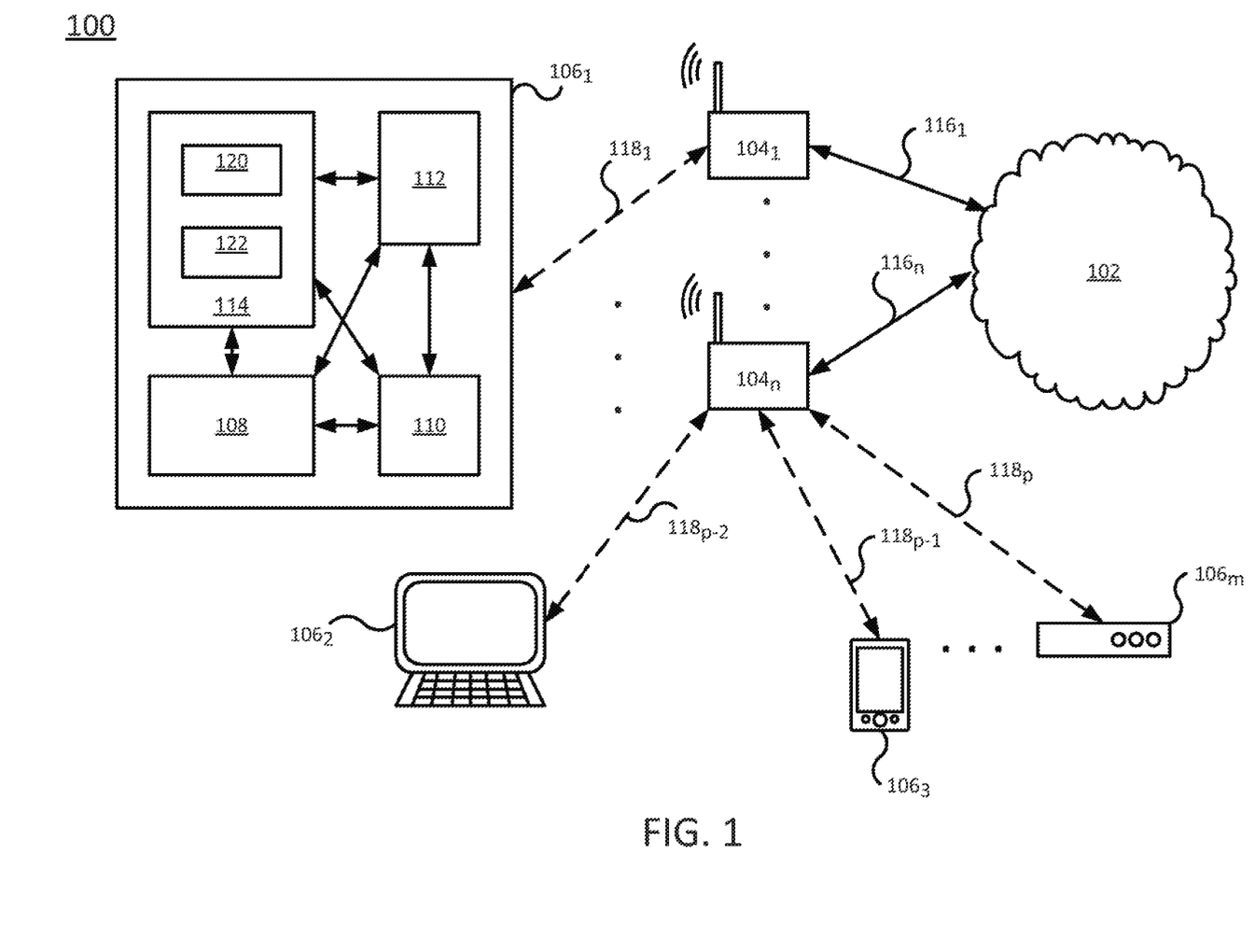
FIG. 1 depicts a high-level block diagram of an example network in which examples of the present disclosure are implemented.

FIG. 1 depicts a high-level block diagram of an example network 100 in which examples of the present disclosure are implemented. As shown in FIG. 1, the network 100 connects wireless client stations $106_1$-$106_n$ (hereinafter collectively referred to as "wireless client stations 106") with a wired communications network 102.

The wired communications network 102 may functionally comprise a fixed mobile convergence (FMC) network, e.g., an IP Multimedia Subsystem (IMS) network. In addition, wired communications network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Wired communications network 102 may also further comprise a broadcast television network, e,g., a traditional cable provider network or an Internet Protocol Television (IPTV) network, as well as an Internet Service Provider (ISP) network.

A plurality of wireless access points (APs) $104_1$-$104_n$ (hereinafter collectively referred to as "APs 104" or "access points 104") are connected to the network 102 via respective wired connections $116_1$-$116_n$ (hereinafter collectively referred to as "wired connections 116"). Although the APs 104 in FIG. 1 are all illustrated as being connected to the same network 102, in other examples one or more of the APs 104 may be connected to other networks (i.e., other than the network 102). In one example, one or more of the APs 104 may comprise a standalone device that connects to the network 102 via one or more routers (e.g., wired Ethernet routers and/or IEEE 802.11 (Wi-Fi) routers). In another example, one or more of the APs 104 may be integrated into a router that connects directly to the network 102.

Each of the APs 104 provides one or more wireless connections $118_1$-$118_p$ (hereinafter collectively referred to as "wireless connections 118"), e.g., using radio frequency or other near field communication links. The wireless connections 118 allow the wireless client stations 106 to utilize the wired connections 116 to the network 102.

In one example each of the wireless client stations 106 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a gaming console, a smart watch, a set top box, a digital media player, and the like. In one embodiment, any one or more of the wireless client stations 106 may have both WiFi and non-WiFi access capabilities and may further have wired communication and networking capabilities. For example, one or more of the wireless client stations 106 may be equipped with an application to send control signals to APs 104 and other devices via a wireless communication device such as an infrared transmitter or transceiver, a transceiver for IEEE 802.11 based communications (e.g., Wi-Fi), IEEE 802.15 based communications (e.g., "Bluetooth", "ZigBee", etc.), and so forth, where the wireless client stations 106 are similarly equipped to receive such a signal One of these wireless client stations 106 is illustrated in further detail in FIG. 1. In particular, wireless client station $106_1$ depicts a high-level block diagram of an example wireless client station that can be transformed into a machine capable of performing the functions described herein. Notably, no computer or machine currently exists that performs the functions as described herein. As a result, the examples of the present disclosure modify the operation and functioning of a general-purpose computer to allow the user of a wireless client station $106_1$ to select a wireless AP for network access, as disclosed herein. Any of the wireless client station 106 illustrated in FIG. 1 may be configured in a manner similar to the wireless client station $106_1$.

As depicted in FIG. 1, the wireless client station $106_1$ comprises a hardware processor element 108, e.g., a central processing unit (CPU), a microprocessor, or a multi-core processor, a memory 110, e.g., a temporary memory such as random access memory (RAM) and/or read only memory (ROM), a load balancing module 114 for selecting a wireless AP through which to connect to the network 102, and various input/output (I/O) devices 112, e.g., storage devices, including but not limited to, one or more of: a tape drive, a floppy drive, a hard disk drive or a compact disk drive, a wireless communication device such as a receiver or a transmitter, a speaker, a display, a speech synthesizer, an output port, an input port and a user input device, such as a keyboard, a keypad, a mouse, a microphone, and the like. In some examples, load balancing module 114 may be implemented as a process executable by hardware processor element 108.

Although one processor element is shown, it should be noted that the wireless client station $106_1$ may employ a plurality of processor elements. Furthermore, although one wireless client station $106_1$ is shown in the figure, if the method(s) as discussed below is implemented in a distributed or parallel manner fora particular illustrative example, i.e., the blocks of the below method(s) or the entire method(s) are implemented across multiple or parallel host computing systems, then the wireless client station $106_1$ of this figure is intended to represent each of those multiple host computing systems. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a host computing system or any other hardware equivalents, e.g., computer readable instructions pertaining to the method(s) discussed below can be used to configure a hardware processor to perform the blocks, functions and/or operations of the below disclosed methods.

Figure 2:
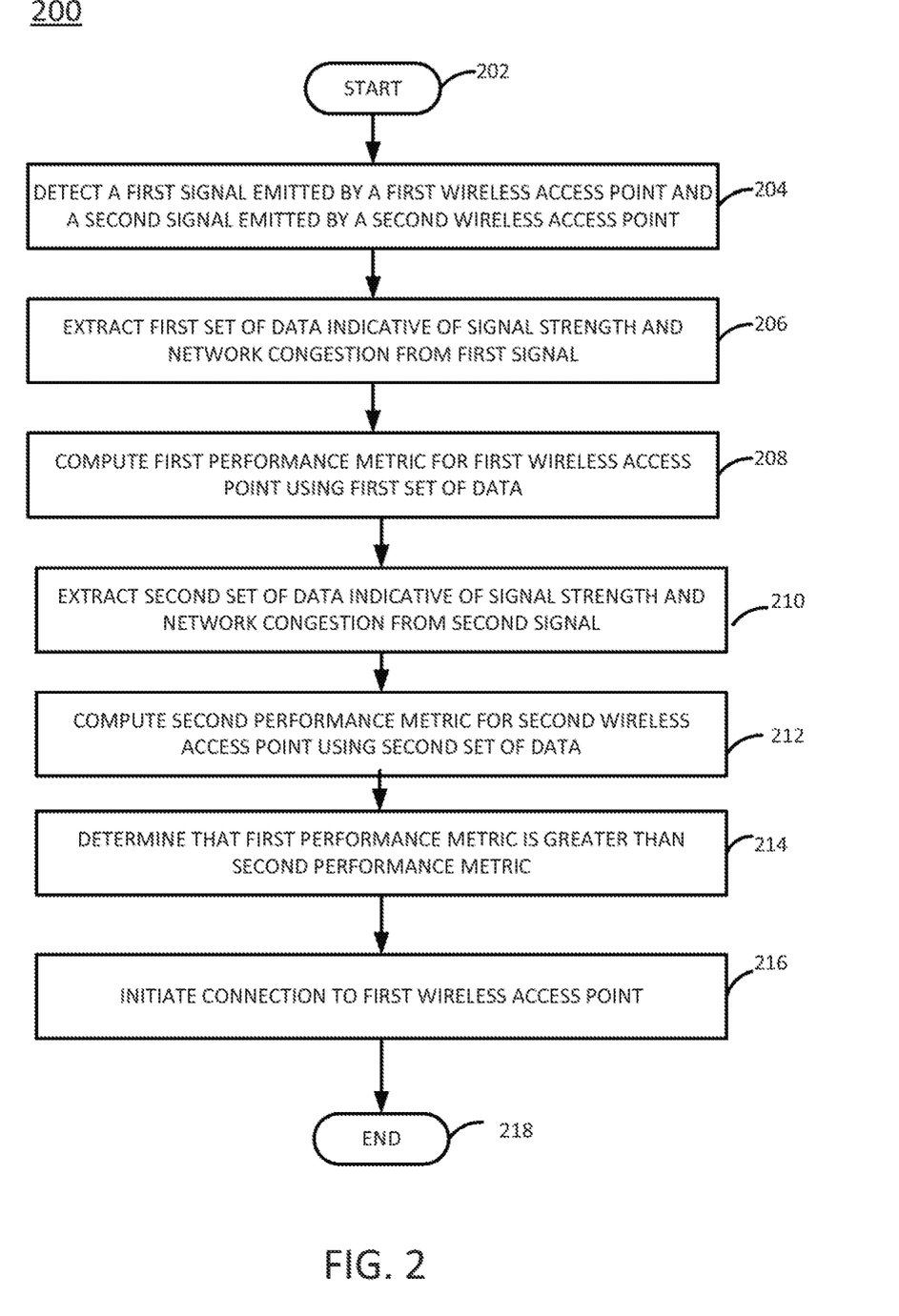
FIG. 2 illustrates a flow diagram of an example method for selecting a wireless access point via which to connect to a wired network.
Figure 3:
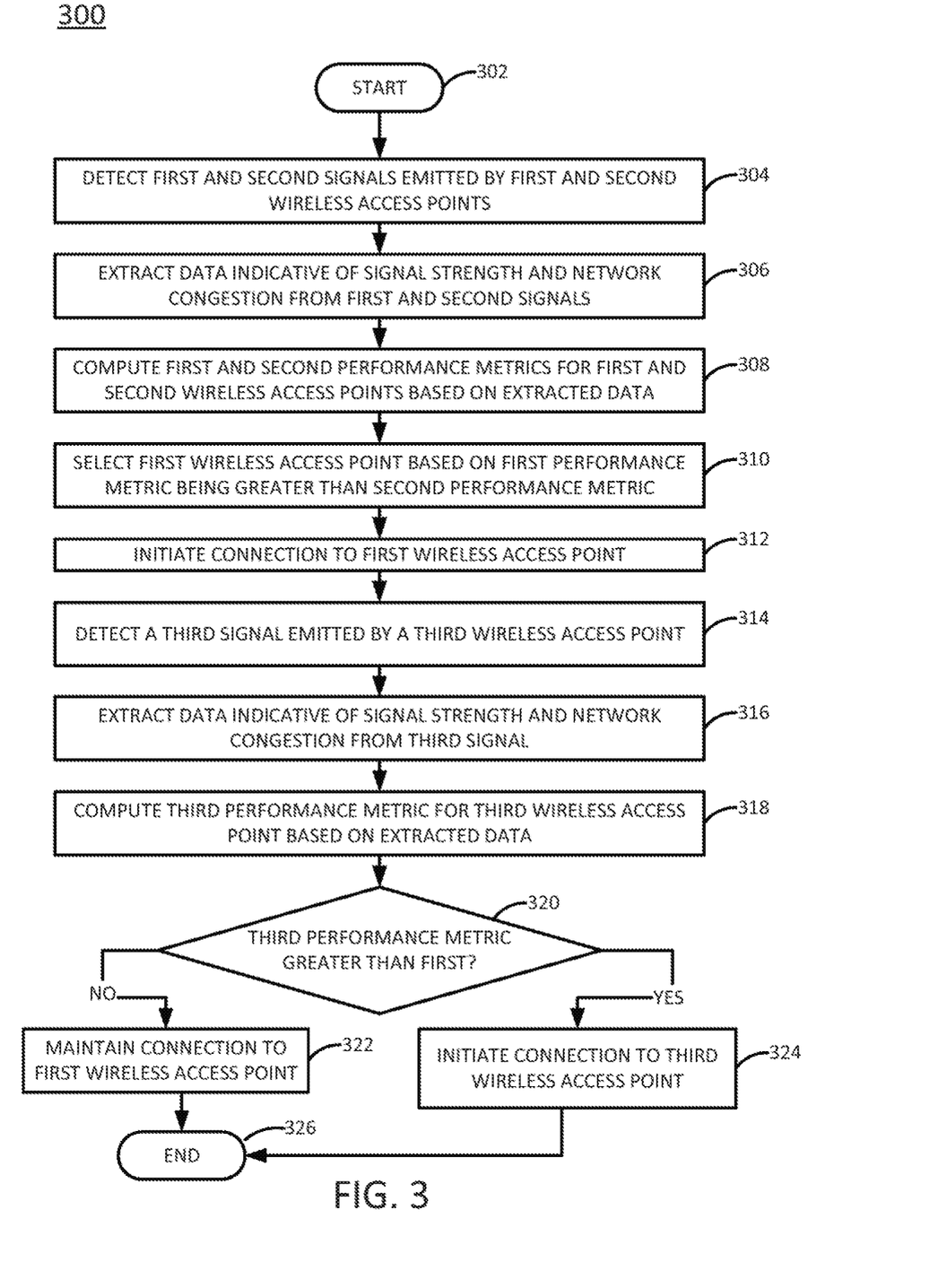
FIG. 3 illustrates a flow diagram of another example method for selecting a wireless access point via which to connect to a wired network.

In one example, instructions and data for the present module 114 for load balancing, e.g., machine readable instructions can be loaded into memory 110 and executed by hardware processor element 108 to implement the blocks, functions or operations as discussed below in connection with the methods 200 and 300. For instance, the module 114 may include a plurality of programming code components, including a signal strength index component 120 and/or a performance evaluation component 122.

The signal strength index component 120 may be configured compute the strength of a signal received from a wireless AP 104, for example as discussed in connection with FIGS. 2-3. For instance, the signal strength index component 120 may be configured to compute a received signal strength indicator (RSSI). The performance evaluation component 122 may be configured to evaluate the relative performances of a plurality of wireless APs 104 in range of the wireless client station $106_1$, for example as discussed in connection with FIGS. 2-3. For instance, the performance evaluation component 122 may compute respective performance metrics for the wireless APs 104 and identify which of the wireless APs 104 offers the best performance, based on the performance metrics.

Furthermore, when a hardware processor executes instructions to perform "operations", this could include the hardware processor performing the operations directly and/ or facilitating, directing, or cooperating with another hardware device or component, e.g., a co-processor and the like, to perform the operations, The processor executing the machine readable instructions relating to the below described method(s) can be perceived as a programmed processor or a specialized processor. As such, the present module 114 for load balancing, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer.

Those skilled in the art will realize that the network 100 may be implemented in a different form than that which is illustrated in FIG. 1, or may be expanded by including additional endpoint devices, access networks, network elements, application servers, etc. without altering the scope of the present disclosure.

FIG. 2 illustrates a flow diagram of a method 200 for selecting a wireless access point via which to connect to a wired network. The method 200 may be performed, for example, by one of the wireless client stations 106 of FIG. 1. As such, reference may be made in the discussion of the method 200 to components of the wireless client stations $106_1$ of FIG. 1. However, such references are made for the sake of example, and are not intended to be limiting.

The method 200 begins in block 202. In block 204, an I/O device 112 of the wireless client station $106_1$ (e.g., an antenna of a network interface controller) detects a first signal emitted by a first wireless AP, such as the wireless AP $104_1$ of FIG. 1 and a second signal emitted by a second wireless AP, such as the wireless AP $104_n$ of FIG. 1. In one embodiment, the first and second signals may also be referred to as "beacons" or "beacon frames." The beacon frames are transmitted periodically by the APs 104 to announce the capabilities and configurations of the local area networks (LANs) supported by the APs 104.

In block 206, the load balancing module 114 (potentially in cooperation with the processor 108) extracts a first set of data from the first signal. The first set of data includes information about the capabilities and configurations of the LAN supported by the first wireless AP $104_1$. In one example, the first set of data includes information about the signal strength of the first wireless AP $104_1$ and the congestion of the LAN supported by the first wireless AP $104_1$. In one example, information about the signal strength may be computed as a received signal strength indicator (RSSI). For instance, the RSSI may be proportional to the power received at the wireless client station's antenna (e.g., how well the wireless client station $106_1$ can "hear" the first wireless AP $104_1$). Thus, although RSSI represents signal strength, it is a relative index rather than an absolute measure.

In one example, information about network congestion may be extracted from a Quality of Service enhanced basic service set (QBSS) information element in an IEEE 802.11e signal. The QBSS information element may contain one or more of the following sets of information: (1) station count (e.g., the number of wireless client stations currently associated with the first wireless AP $104_1$); (2) channel utilization (e.g., the percentage of time that the first wireless AP $104_1$ sensed the medium was busy); and (3) available admission capacity (e.g., the remaining amount of medium time available via explicit admission control). In one example, QBSS load is extracted from the signals when AP Quality of Service (QoS) is supported and provides the load information.

In one example, other data that may be extracted from the first signal in block 204 includes data about the coding rate or data rate, which is correlated with signal strength. Other data may also include any other metrics that may indicate faster data rates (e.g., faster download and/or upload speeds). For instance, assuming the APs 104 are connected to different networks (e.g., not all of the APs 104 are connected to the network 102), this other data could include data such as the first wireless AP's connection type and/or backend network connectivity (e.g., connection speeds of fiber optic versus Ethernet versus direct subscriber line, etc.).

In block 208, the load balancing module 114 (potentially in cooperation with the processor 108) computes a first performance metric for the first wireless AP $104_1$. In one example, the first performance metric is computed using the first set of data extracted in block 206. For instance, in one example, the first performance metric is computed using signal strength and network congestion. The various metrics of signal strength and network congestion may be normalized and/or weighted, and the performance metric computed as a sum of these normalized and/or weighted metrics (i.e., as a weighted sum). For instance, a metric indicative of signal strength may be multiplied by a first weight, and a metric indicative of network congestion may be multiplied by a second weight. These two weighted values may then be added together to produce a first weighted sum that is the first performance metric. If both the first weight and the second weight are the same (e.g., 1), then the individual metrics are essentially unweighted. In one example, the weights are hard-coded into the wireless client station $106_1$ (e.g., into the load balancing module 114), but in other examples the weights may be adjustable or even user configurable.

In a further example, the historical performance for the first wireless AP $104_1$ could also be taken into account when computing the first performance metric. For instance, the first wireless AP $104_1$ may have proven in the past to provide lackluster rates (e.g., outside the scope of the known metrics) once connected, despite exhibiting high performance metrics. Thus, a weighting could be applied to account for the observed discrepancy between the first wireless AP's past performance metrics and past observed performance.

In block 210, the load balancing module 114 (potentially in cooperation with the processor 108) extracts a second set of data from the second signal. The second set of data includes information about the capabilities and configurations of the LAN supported by the second wireless AP $104_n$. In one example, the second set of data includes information about the signal strength of the second wireless AP $104_n$ and the congestion of the LAN supported by the second wireless AP $104_n$. In one example, information about the signal strength and network congestion may be computed as discussed above. In a further example, other data that may be extracted from the second signal in block 204 includes data about the coding rate or data rate, as well as any other metrics that may indicate faster data rates (e.g., faster download and/or upload speeds).

In block 212, the load balancing module 114 (potentially in cooperation with the processor 108) computes a second performance metric for the second wireless AP $104_n$. In one example, the second performance metric is computed using the second set of data extracted in block 210. For instance, in one example, the second performance metric is computed using signal strength and network congestion.

In block 214, the load balancing module 114 (potentially in cooperation with the processor 108) determines that the first performance metric is greater (e.g., better on some scale) than the second performance metric. For instance, the first performance metric may comprise a number that is greater than the second performance metric on some scale. In another example, the first performance metric may comprise a number that is lower on some scale than the second performance metric. In another example, where the first wireless AP $104_1$ has been observed in the past to provide performance that is not commensurate with the first performance metric, the second wireless AP $104_n$ may be selected instead.

In block 216, an I/O device 112 of the wireless client station $106_1$ (e.g., an antenna of a network interface controller or other wireless communication device) initiates a connection to the first wireless AP $104_1$. For instance, the first wireless AP $104_1$ may be contacted directly using the media access control (MAC) address or another identifier for the first wireless AP $104_1$ that is contained in the first signal. Establishing the connection may involve authentication of the wireless client station $106_1$ and/or other exchange of data if it is the first time that the wireless client station $106_1$ is attempting to connect to the first wireless AP $104_1$.

Thee method 200 ends in block 218.

FIG. 3 illustrates a flow diagram of another method 300 for selecting a wireless access point via which to connect to a wired network. In one example, the method 300 is a more detailed version of the method 200. Thus, the method 300 may be performed, for example, by one of the wireless client stations 106 of FIG. 1. As such, reference may be made in the discussion of the method 200 to components of the wireless client stations $106_1$ of FIG. 1. However, such references are made for the sake of example, and are not intended to be limiting.

The method 300 begins in block 302. In block 204, an I/O device 112 of the wireless client station $106_1$ (e.g., an antenna of a network interface controller) detects first and second signals emitted by first and second wireless APs, respectively. The first and second wireless APs may be APs such as the wireless APs 104 illustrated in FIG. 1.

In block 306, the load balancing module 114 (potentially in cooperation with the processor 108) extracts first and second sets of data from the first and second signals, respectively. The first and second sets of data include information about the capabilities and configurations of the LANs supported by the first and second wireless APs. In one example, the first and second sets of data include information about the respective signal strengths of the first and second wireless APs and the congestion of the LANs supported by the first and second wireless APs. The first and second sets of data may be determined or computed as described above.

In block 308, the load balancing module 114 (potentially in cooperation with the processor 108) computes first and second performance metrics for the first and second wireless APs, respectively. In one example, the first and second performance metrics are computed as described above, using the first an second sets of data, respectively.

In block 310, the load balancing module 114 (potentially in cooperation with the processor 108) selects the first wireless AP, based on a determination that the first performance metric is greater (on some scale) than the second performance metric.

In block 312, an I/O device 112 of the wireless client station $106_1$ (e.g., an antenna of a network interface controller) initiates a connection to the first wireless AP.

In block 314, an I/O device 112 of the wireless client station $106_1$ (e.g., an antenna of a network interface controller) detects a third signal emitted by a third wireless AP.

In block 316, the load balancing module 114 (potentially in cooperation with the processor 108) extracts a third set of data from the third signal. The third set of data includes information about the capabilities and configurations of the LAN supported by the third wireless AP. In one example, the third set of data includes information about the signal strength of the third wireless AP and the congestion of the LAN supported by the third wireless AP.

In block 318, the load balancing module 114 (potentially in cooperation with the processor 108) computes a third performance metric for the third wireless AP. In one example, the third performance metric is computed in the same way that the first and second performance metrics were computed in block 308 (but using the third set of data). In one example, block 318 may also include re-computing the first and/or second performance metric.

In block 320, the load balancing module 114 (potentially in cooperation with the processor 108) determines whether the third performance metric is greater (e.g., better on some scale) than the first performance metric.

If the load balancing module 114 concludes in block 320 that the third performance metric is not greater than the first performance metric, then the method 300 proceeds to block 322. In block 322, the connection to the first wireless AP is maintained.

If, however, the load balancing module 114 concludes in block 320 that the third performance metric is greater than the first performance metric, then the method 300 proceeds to block 324. In block 324, a connection is initiated to the third wireless AP. In one example, a connection is not made to the third wireless AP unless the third performance metric provides some threshold amount of improvement over the first performance metric. For instance, the connection may not be made to the third wireless AP unless the improvement in performance is at least twenty percent (or some other amount) relative to the performance of the first wireless AP. This will prevent wireless client devices from continuously switching APs over time.

The method 300 ends in block 326, once the load balancing module 114 has determined whether to remain connected to the first wireless AP or connect to the third wireless AP. In operation. however, the method 300 may not end, but continuously iterate through steps 314-324 as new signals are detected from the wireless APs within range of the wireless client station. For instance, the performances of the available wireless APs may change over time, new wireless APs may become available, or previously available wireless APs may become unavailable. Iterating through at least portions of the method 300 allows the wireless client station to continuously and dynamically evaluate which wireless AP will offer the best performance at any given time and to switch from one wireless AP to another wireless AP when doing so may offer an improvement in performance.

It should be noted that although not explicitly specified, some of the blocks, functions, or operations of the methods 200 and 300 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIGS. 2-3 that recite a determining operation, or involve a decision, do not imply that both branches of the determining operation are practiced. In other words, one of the branches of the determining operation may not be performed, depending on the results of the determining operation.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
   detecting, by a wireless client station, a first signal emitted by a first wireless access point and a second signal emitted by a second wireless access point;
   extracting a first set of data indicative of a signal strength of the first wireless access point and a network congestion of the first wireless access point, wherein the first set of data includes a channel utilization of the first wireless access point, and wherein the channel utilization of the first wireless access point comprises a percentage of time that the first wireless access point sensed that a communication medium provided by the first wireless access point was busy;
   computing a first performance metric of the first wireless access point based on the first set of data;
   extracting a second set of data indicative of a signal strength of the second wireless access point and a network congestion of the second wireless access point, wherein the second set of data includes a channel utilization of the second wireless access point, and wherein the channel utilization of the second wireless access point comprises a percentage of time that the second wireless access point sensed that a communication medium provided by the second wireless access point was busy;
   computing a second performance metric of the second wireless access point based on the second set of data;
   determining that the first performance metric is greater than the second performance metric; and
   initiating a connection to the first wireless access point in response to the determining.

2. The method of claim 1, wherein the first set of data includes a received signal strength indicator of the first wireless access point.

3. The method of claim 1, wherein at least some of the first set of data is extracted from a Quality of Service enhanced basic service set information element of the first wireless access point.

4. The method of claim 1, wherein the first signal comprises a beacon frame which is transmitted by the first wireless access point to announce capabilities and configurations of a local area network supported by the first wireless access point.

5. The method of claim 1, wherein the first set of data includes a coding rate of the first wireless access point.

6. The method of claim 1, wherein the first performance metric comprises a first weighted sum of individual metrics representing the signal strength of the first wireless access point and the network congestion of the first wireless access point.

7. The method of claim 1, further comprising:
detecting, after the initiating, a third signal emitted by a third wireless access point;
extracting a third set of data indicative of a signal strength of the third wireless access point and a network congestion of the third wireless access point;
computing a third performance metric of the third wireless access point based on the third set of data;
determining that the third performance metric is greater than the first performance metric; and
initiating a connection to the third wireless access point in response to the determining that the third performance metric is greater than the first performance metric.

8. The method of claim 1, wherein the first set of data further includes an available admission capacity of the first wireless access point, and wherein the available admission capacity of the first wireless access point comprises a remaining amount of medium time available via explicit admission control.

9. The method of claim 1, wherein the first set of data further includes a station count, and wherein the station count comprises a number of wireless client stations currently associated with the first wireless access point.

10. The method of claim 1, wherein the first set of data further includes a connection type of the first wireless access point.

11. The method of claim 1, wherein the first set of data further includes a backend network connectivity of the first wireless access point.

12. The method of claim 1, wherein the first set of data further includes an observed historical performance of the first wireless access point.

13. The method of claim 12, wherein the computing the first performance metric comprises applying a weighting to account for an observed discrepancy between the past performance metrics of the first wireless access point and the observed historical performance of the first wireless access point.

14. An apparatus, comprising:
an antenna to detect a first signal emitted by a first wireless access point and a second signal emitted by a second wireless access point, wherein the first signal contains a first set of data indicative of a signal strength of the first wireless access point and a network congestion of the first wireless access point and the second signal contains a second set of data indicative of a signal strength of the second wireless access point and a network congestion of the second wireless access point, wherein the first set of data includes a channel utilization of the first wireless access point, wherein the channel utilization of the first wireless access point comprises a percentage of time that the first wireless access point sensed that a communication medium provided by the first wireless access point was busy, wherein the second set of data includes a channel utilization of the second wireless access point, and wherein the channel utilization of the second wireless access point comprises a percentage of time that the second wireless access point sensed that a communication medium provided by the second wireless access point was busy;
a processor to compute a first performance metric of the first wireless access point and a second performance metric of the second wireless access point, wherein the first performance metric is based on the first set of data, and wherein the second performance metric is based on the second set of data; and
a wireless communication device to initiate a connection to the first wireless access point in response to a determination by the processor that the first performance metric is greater than the second performance metric.

15. The apparatus of claim 14, wherein the first set of data further includes a received signal strength indicator of the first wireless access point.

16. A non-transitory machine-readable storage medium encoded with instructions executable by a processor of a wireless client device, the machine-readable storage medium comprising:
instructions to detect a first signal emitted by a first wireless access point and a second signal emitted by a second wireless access point;
instructions to extract a first set of data indicative of a signal strength of the first wireless access point and a network congestion of the first wireless access point, wherein the first set of data includes a channel utilization of the first wireless access point, and wherein the channel utilization of the first wireless access point comprises a percentage of time that the first wireless access point sensed that a communication medium provided by the first wireless access point was busy;
instructions to compute a first performance metric of the first wireless access point based on the first set of data;
instructions to extract a second set of data indicative of a signal strength of the second wireless access point and a network congestion of the second wireless access point, wherein the second set of data includes a channel utilization of the second wireless access point, and wherein the channel utilization of the second wireless access point comprises a percentage of time that the second wireless access point sensed that a communication medium provided by the second wireless access point was busy;
instructions to compute a second performance metric of the second wireless access point based on the second set of data;
instructions to determine that the first performance metric is greater than the second performance metric; and
instructions to initiate a connection to the first wireless access point in response to determining that the first performance metric is greater than the second performance metric.

17. The non-transitory machine-readable storage medium of claim 16, wherein the first set of data includes a received signal strength indicator of the first wireless access point.

18. The non-transitory machine-readable storage medium of claim 16, wherein some of the first set of data is extracted from a Quality of Service enhanced basic service set information element of the first wireless access point.

19. The non-transitory machine-readable storage medium of claim 16, wherein the first set of data includes a coding rate of the first wireless access point.

20. The non-transitory machine-readable storage medium of claim 16, wherein the first performance metric comprises a first weighted sum of individual metrics representing the signal strength of the first wireless access point and the network congestion of the first wireless access point.

\* \* \* \* \*